Jan. 18, 1955 L. B. NEIGHBOUR 2,699,948
MATERIAL SPREADER WITH TILTING BODY
Filed Aug. 17, 1950 2 Sheets-Sheet 1
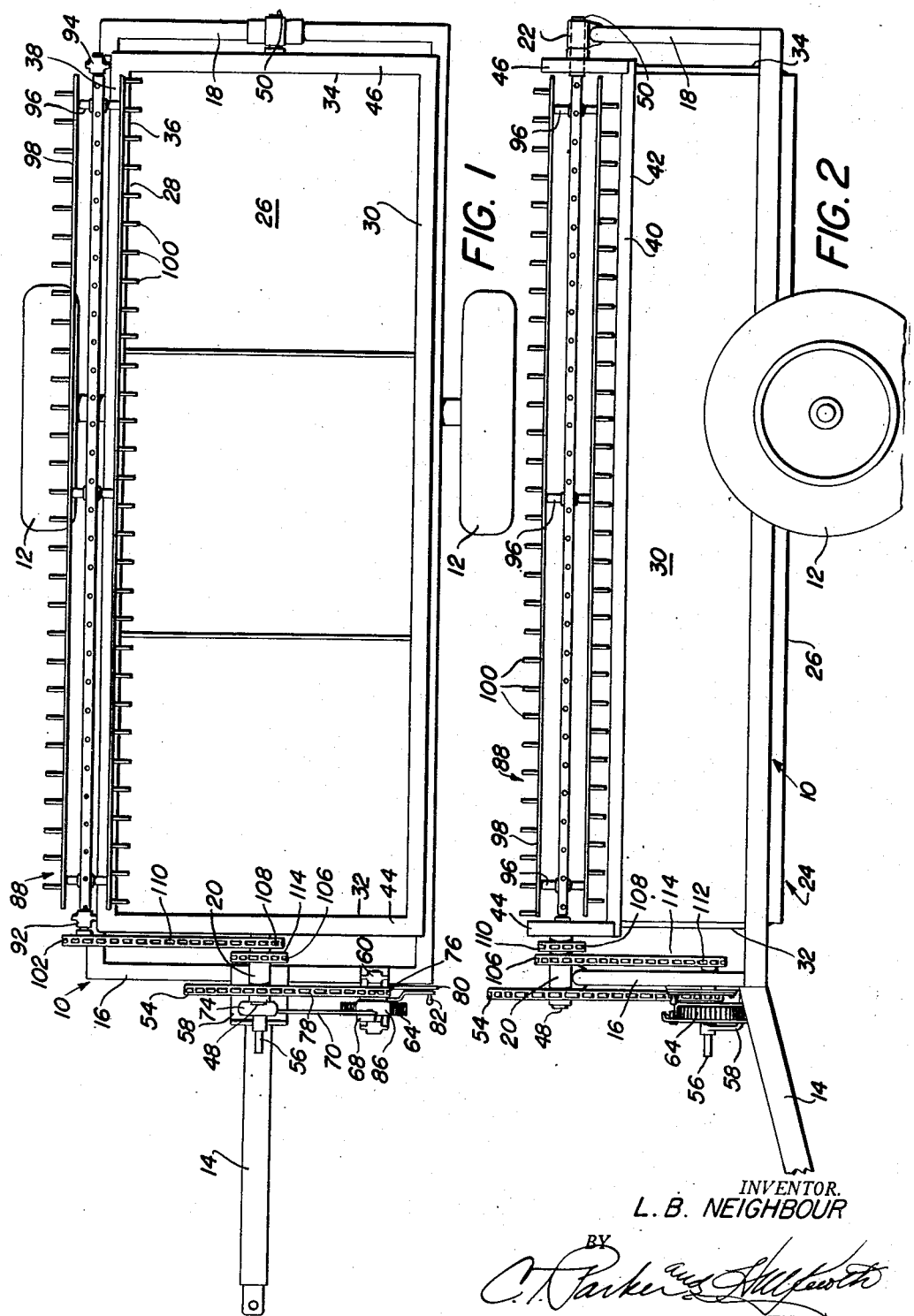
INVENTOR.
L. B. NEIGHBOUR
BY
ATTORNEYS

# United States Patent Office 2,699,948
Patented Jan. 18, 1955

2,699,948

MATERIAL SPREADER WITH TILTING BODY

Leonard B. Neighbour, Moline, Ill., assignor to Deere & Company, Moline, Ill., a corporation of Illinois Application August 17, 1950, Serial No. 179,922

15 Claims. (Cl. 275—4)

This invention relates to a material spreader and more particularly to a spreader of the character utilized on farms for the spreading or distribution of manure and other fertilizers.

A spreader of the conventionally known type utilized for the distribution of solid manure comprises an elongated body open at its rear end and adapted to carry a load of manure which is moved toward this rear end by a rearwardly moving apron for discharging the material through a zone in which beaters and spreaders operate to scatter the material over a substantial area of the ground immediately to the rear of the forwardly moving spreader. Another type of spreader found in rather limited use is the so-called liquid spreader which is said to have certain advantages in the spreading of combined liquid and solid manures. To the extent developed so far, the liquid spreader is primarily a copy of the conventional solid-manure spreader, with the exception that a liquid-tight bottom is provided. This bottom must be recessed somewhat intermediate the front and rear ends of the body so that the liquid can settle to the bottom without running out the rear end. In order that the mixing of the liquid with the solid manure may be accomplished during spreading, an apron similar to the conventional apron is designed so that in theory it will move through the settled liquid and upwardly into the solid manure before the mixture is discharged into the beater and distributor zone. It is found that because of manufacturing difficulties, a tight fit cannot be obtained between the apron and the bottom of the spreader body, with the result that after the spreader is considered emptied, pools of liquid will collect in the low portions of the body. If these pools are not drained, the corrosive action of the liquid will shortly develop substantial leaks in the spreader body bottom. Attempts have been made to overcome this difficulty by the provision of drain plugs and the like for draining the spreader body prior to storage thereof. However, the corrosive action of the liquid soon renders these plugs and other devices substantially inoperative, in the sense that the user considers the drainage task too onerous for performance.

According to the present invention, the difficulties outlined above are eliminated by departing somewhat from the conventional design of spreader. To this extent, the spreader is provided with a body that can be tilted so that the material may be discharged over an upper edge portion of one of the walls defining the body. Specifically, it is an object of the invention to provide the body in the form of an elongated tank having a semi-cylindrical shape providing contiguous arcuate bottom and side wall portions. The body is carried on the frame by means providing for tilting of the body about the principal axis thereof, so that the upper edge of one of the side wall portions is lowered relative to the remainder of the body, wherefore material will flow toward this edge. Another object of the invention is to provide beater or spreader means along this edge for distributing the material as it moves over the discharge edge. Since the body may be completely inverted, all material left therein after use of the spreader is discontinued will drain completely out of the body.

A further object of the invention is to provide single and compact driving means for simultaneously tilting the body and driving the distributing means. It is a feature of this driving mechanism that a single input member operating at a constant speed is utilized for both purposes. A pair of power-transmitting means are utilized, one being operative at a higher speed than the other. The low-speed means is used for tilting the body. A further feature of the low-speed means is that it includes variable-speed means so that the rate of angular movement of tilting of the body can be selectively varied. The driving means is arranged so that it may be readily driven by the power take-off shaft of a tractor or other vehicle utilized for drawing the spreader over the field.

The foregoing and other important objects and desirable features inheret in and encompassed by the invention will become apparent from the following disclosure of a preferred embodiment of the invention as set forth in the annexed specification and drawings.

In the drawings:

Figure 1 is a top plan view of a spreader incorporating the principles of the invention;

Figure 2 is a side elevational view of the spreader;

The spreader comprises essentially a longitudinal frame 10, elongated in the direction of travel or advance of the spreader, and rendered mobile by a pair of wheels 12. A draft tongue 14 is provided at the front end of the frame for connection of the spreader to a draft vehicle, such as a tractor.

Figure 3:
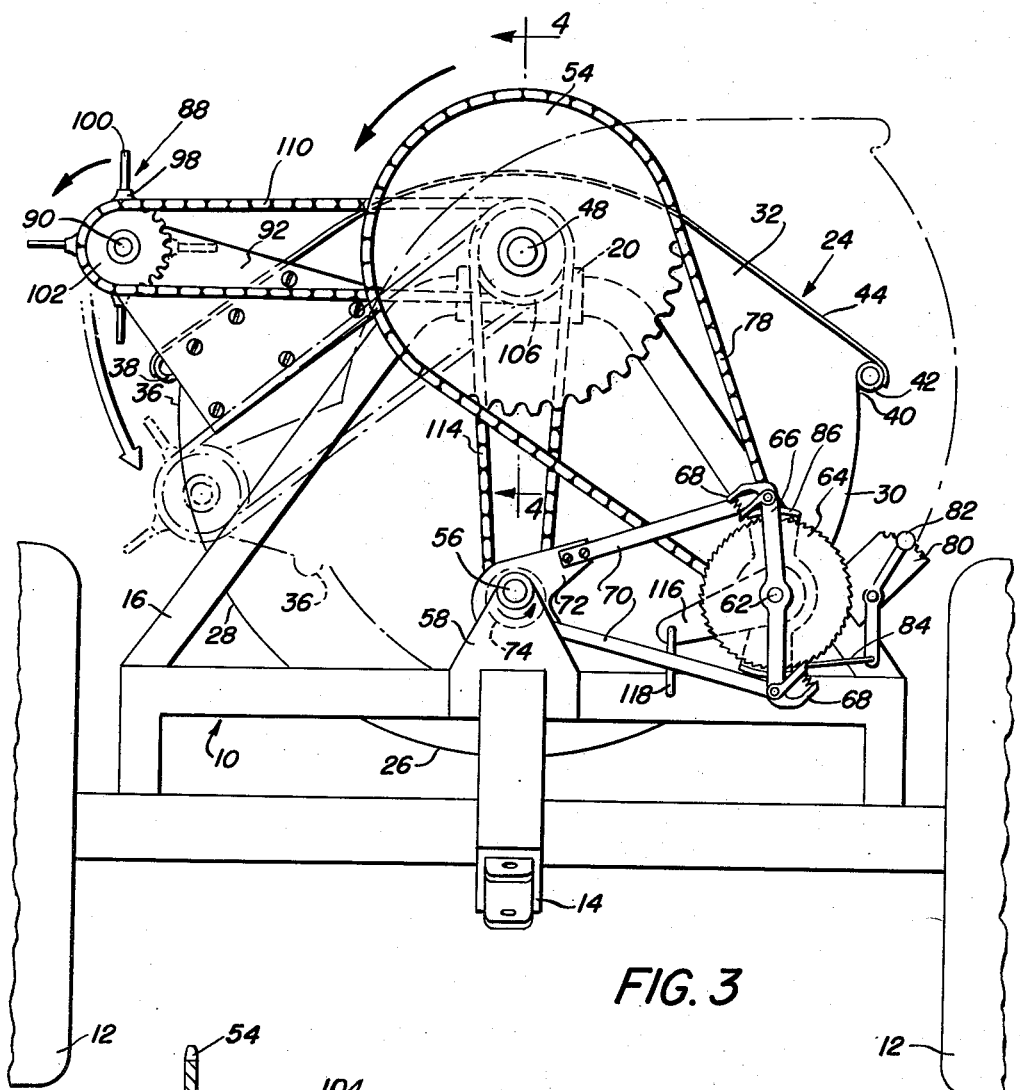
Figure 3 is a front end view, on an enlarged scale, of the spreader.

The frame 10 includes respectively at its front and rear ends front and rear erect supports 16 and 18. The front support has at its upper end means providing a bearing 20 on a longitudinal axis disposed horizontally at a level above the main level of the frame 10. The rear support 18 has a similar bearing 22. The bearings are coaxial to provide a longitudinal horizontal tilting axis for the carrying of a spreader body designated generally by the numeral 24. This body, as best seen in Figure 3, is of semi-cylindrical shape to provide an arcuate bottom portion 26 and contiguous arcuate side wall portions 28 and 30. The body is closed at its front and rear ends respectively by generally semi-circular end walls 32 and 34.

The bottom, side and end walls are imperforate and the joints are appropriately sealed so that the body is liquid-tight. The side wall portion 28 terminates in an upper, longitudinal edge portion 36 which may be reenforced by a longitudinal tubular member 38. The opposite side wall portion terminates in a longitudinal upper edge 40 reenforced by a longitudinal tubular member 42. The front and rear end walls 32 and 34 are respectively flanged at 44 and 46 for added strength.

The body is disposed normally in the position shown in full lines in the drawings; that is, with its bottom lowermost and its open top uppermost. The body runs lengthwise of the frame and therefore lengthwise as respects the direction of travel of the spreader. It is positioned intermediate the bearings 20 and 22 of the supports 16 and 18.

Figure 4:
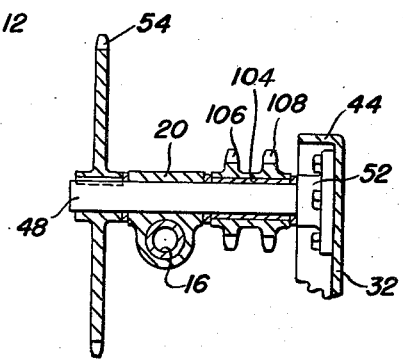
Figure 4 is a fragmentary sectional view taken substantially on the line 4—4 of Figure 3.

The means for carrying the body on the frame for tilting about the longitudinal tilting axis through the bearings 20 and 22 comprises a pair of trunnions 48 and 50 journaled respectively in the front and rear bearings 20 and 22. The rear trunnion 50 comprises a stub shaft carried in any appropriate manner in the bearing 22. The front trunnion comprises a relatively elongated shaft having at its rear end a flanged element 52 appropriately secured rigidly to the front end wall 32 (Figure 4). The manner of mounting the trunnion or shaft 48 on the front wall 32 may be taken as typical of the manner in which the rear trunnion 50 is secured to the rear wall 34.

The shaft 48 projects ahead of the bearing 20 and has keyed thereto a rotary member in the form of a relatively large sprocket 54. This sprocket is driven by variable speed means for the purpose of effecting tilting of the body, the details of which mechanism will be described below.

The general spreader construction illustrated is typical of that utilized behind a tractor or other draft vehicle having power take-off means. In the conventional tractor, the power take-off means is at the rear of the tractor and it is conventionally known to make power-transmitting connections between the power take-off shaft and an input shaft on the implement. Such an input shaft is shown at 56 in the present case. This shaft is journaled in a suitable bearing 58 on the longitudinal center line of the spreader frame 10 and below the bearing axis through the bearings 20 and 22. Since the input shaft 56 is or will be driven by the power take-off shaft of a tractor or the like, it is expected that it will rotate at a substantially constant speed. This speed will be substantially higher than that at which angular or tilting movement should be imparted to the body. Therefore, speed-reduction means may be utilized.

The mechanism utilized may be of any type suitable for the purposes. That illustrated here is based on the mechanism disclosed in the U. S. Patent to Brown 1,215,614. In the present case, a bearing support 60 is offset to one side of the axis of the shaft 56 to provide for the journaling of an intermittently running member such as a longitudinal shaft 62. This shaft carries thereon a ratchet wheel 64 and also carries a diametrically extending arm 66 having at opposite ends thereof spring-loaded pawls 68. These pawls are connected by means of the outer end of the arm 66 to links 70 which converge toward and are connected to a rotary driving member 72 powered by a constantly running driving member in the form of an eccentric 74 keyed to the input shaft 56. The arm 66 is preferably loose on the shaft 62 and the ratchet wheel 64 is therefore keyed to this shaft, as is a relatively small sprocket 76. Power-transmitting means including an endless chain or belt 78 is trained about the small sprocket 76 and the relatively larger sprocket 54. As the shaft 56 and eccentric 74 are rotated, the arm 66 is oscillated to selectively and alternately engage the pawls 68 with the ratchet wheel 64. This imparts step-by-step or incremental motion to the ratchet wheel which motion is in turn imparted to the sprocket 54 by means of the driving chain 78. It will be appreciated that the rate of movement of the sprocket 54 is thus considerably reduced below the speed of the input shaft 56. Any other suitable means may be utilized for obtaining the necessary low-speed movement.

In order that the speed of angular movement of the body 24 about its tilting axis 20—22 may be varied, variable-speed mechanism is incorporated in the power-transmitting means between the input shaft 56 and the shaft 48 on which the body-tilting sprocket 54 is mounted. On the basis of the driving mechanism illustrated, the variable-speed means may be of familiar construction. It is here shown as including a notched sector 80 with which is associated a control lever 82 in the form of a bell crank having a link connection at 84 with a diametrically extending cam 86 having diametrically opposed portions respectively associated with the pawls 68. The cam 86 is rockably carried by the shaft 62 and the angular position thereof may be selectively adjusted by the control lever 82 in order to vary the extent to which the end of the cam will be interposed between the ratchet wheel and the pawls. As will be seen in the Brown patent identified above, and as will be suggested here, adjustment of the cam 86 varies the action of the pawls 68 on the ratchet wheel 64 to the extent that it varies the range or angle through which the pawls may engage the ratchet wheel. The farther under the pawls the cam 86 is moved, the smaller the angle permissible through which the pawls will engage the ratchet wheel. Therefore, a certain range of the angular movement of the driving arm 66 will be idle and another range will be effective. Although the actual speed of the driving arm 66 is not changed, the time interval of its effectiveness in driving the ratchet wheel can be varied so that the number of strokes that it takes to cause the ratchet wheel to move through a given angle can be decreased or increased. Variations at the ratchet wheel, of course, affect tilting of the body and the successive increments through which the body is or may be tilted are variable in length.

The manner in which the body is tilted is best illustrated in Figure 3. Obviously, as the body is tilted in the counterclockwise direction indicated, the upper edge 36 of the side wall portion 28 is lowered relative to other portions of the body. Thus, material contained within the body will naturally flow by gravity toward and over the edge 36. Because of the incremental feeding or advance of tilt of the body, the quantity of material that will be discharged can be substantially controlled.

To further augment the distribution or discharge of material over the edge 36 of the body, there is provided beater or material-distributing means designated generally by the numeral 88. This means preferably comprises a rotary member in the form of a shaft 90 spaced slightly above and outwardly of and paralleling the upper edge 36 of the side wall portion 28. Brackets 92 and 94 are provided respectively at the front and rear end walls 32 and 34 for journaling the shaft 90. The shaft is provided with a plurality of axially spaced spiders 96 on which are circumferentially arranged a plurality of longitudinally extending bars 98 having spikes or teeth 100. The specific beater construction illustrated is not critical and any other equivalent structure could be used.

The shaft 90 projects forwardly of the front bearing 92 and has keyed thereto a small sprocket 102. Since the axis of the shaft is relatively close to the upper edge 36 of the side wall portion 28, this axis is laterally spaced from and parallel to the tilting axis 20—22, and the sprocket 102 comprises a rotary drivable member or means for imparting rotation to the distributing means 88 in the direction of the arrow indicated.

As best shown in Figure 4, the bearing 20 is spaced somewhat ahead of the front end wall 32 of the body. The shaft 48 extends across this space and has journaled thereon by means of a suitable bearing 104 a double sprocket including sprockets 106 and 108. These sprockets are, of course, free to rotate relative to the slower moving sprocket 54. Part of the power-transmitting means between the input shaft 56 and the distributing means 88 comprises an endless chain or belt 110 trained about the sprockets 108 and 102. The input shaft 56 projects rearwardly behind the front support 16 and has keyed thereto a rotary member or driving sprocket 112. Another part of the power-transmitting means between the shaft 56 and the distributing means 88 includes a driving chain 114 trained about the sprockets 106 and 112. Because of the relative sizes of the sprockets 112, 106, 108, and 102, the speed of rotation of the distributing means 88 will be substantially that of the input shaft 56; although, this can be varied to suit individual desires.

It is a feature of the invention to arrange the driving mechanism so that tilting of the body does not affect the driving mechanism to the distributing means 88. For this reason, the double sprocket 106—108 is coaxial with the tilting axis. Since the shaft 90 is journaled on a fixed axis relative to the tilting axis, there will be no variations in the length of the chain 110 as the body tilts. Therefore, the distributing means will function efficiently regardless of the angle of tilt of the body.

In view of the particular incremental moving means including the ratchet wheel 64, eccentric 74, and pawls 68, and further in view of the desirability of tilting the body through as great an angle as possible so that it can be completely emptied or drained, it is preferred that the driving mechanism include means for retarding the advance of the body when it tilts to such a position that its center of gravity is above and to the left (as viewed in Figure 3) of the tilting axis 20—22. The mechanism shown in the Brown patent referred to above is suitable for this purpose. In view of the available disclosure, it is deemed unnecessary to develop the details here. Essentially, the interior of the ratchet wheel 64 may be provided with an internal gear in constant mesh with a smaller and eccentrically arranged gear associated with anchoring means such as indicated by the arms 116 and 118 in Figure 3 of the instant drawings. The specific details are not part of the present invention and any suitable mechanism could be employed.

The manner in which the body is arranged for tilting is such in the present case that the body may move angularly through 360°. Although the complete range of movement may not be necessary, it is desirable that at least 180° of movement be provided so that the body may be completely inverted; that is, positioned with its open top lowermost and its bottom uppermost. For storage purposes, the inverted body is ideal, since any material left in the body will completely drain out of it and the body cannot accumulate moisture from rain or snow.

Although bodies of other types may be utilized in connection with the broad principles of the present invention, the body shaped as illustrated is desirable or advantageous for many reasons. It may be simply constructed and readily assembled, as by welding. Further, the location of the distributing means 88 at a point outside of the body eliminates the association with the body of moving parts. Hence, the body need not be made extra strong or parts thereof need not be made of wear-resistant material, as is true in those cases in which movable means operate over portions of the body for the purpose of advancing the material to a discharge zone.

Various other features not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. A material spreader, comprising: an elongated, generally horizontal supporting frame having front and rear end portions; wheel means carrying the frame for travel lengthwise over a field; a pair of supports erected respectively at the front and rear end portions of the frame, each support including a bearing on a longitudinal horizontal axis above the level of the frame, and said bearings being coaxial; an elongated material-carrying body disposed lengthwise of the frame and between the supports and having longitudinally spaced front and rear end wall elements, a bottom portion and a pair of longitudinal side wall portions, each of said side wall portions having an upper edge, and said body being normally positioned with the bottom portion at a level below the coaxial bearings; front and rear trunnion means respectively connected to the front and rear end wall elements and mounted respectively in the front and rear supports to carry the body for tilting about the bearing axis; means for tilting the body about the bearing axis to effect the flow of material in the body toward the upper edge of one of the side wall portions; and material-engaging means movably arranged along said one upper edge to engage and move material over said end upper edge as the body is tilted.

2. A material spreader as defined in claim 1, further characterized in that: the means for tilting the body includes driving mechanism for slowly tilting the body so that the flow of material toward said upper edge is gradual.

3. A material spreader as defined in claim 1, further characterized in that: the means for tilting the body includes driving mechanism having a rotary member coaxial with the tilting axis; the material-engaging means includes a rotary member carried by the body on an axis spaced from and parallel to the tilting axis; and power-transmitting means interconnects the rotary members.

4. A material spreader as defined in claim 1, further characterized in that: the material-engaging means includes a rotary member carried by the body on an axis spaced from and parallel to the tilting axis; a rotary driving member is carried by one of the supports coaxial with the tilting axis; and power-transmitting means interconnects the rotary members.

5. A material spreader as defined in claim 1, further characterized in that: one of the trunnions comprises a shaft fixed to the proximate end wall element and journaled in the proximate bearing; the means for tilting the body includes a rotary member fixed to said shaft; the material-engaging means comprises a rotary element carried by the body on an axis parallel to and spaced from the tilting axis; and multi-speed drive mechanism is provided for the body-tilting means and the material-engaging means, including a common input member, power-transmitting means connecting the input member to the rotary member for advancing the body in a tilting direction at one speed, a second rotary member journaled on said trunnion shaft and drivingly connected to the rotary element of the material-engaging means, and secured power-transmitting means interconnecting the input member and the second rotary member for driving the material-engaging means at a speed different from that at which the body tilting means is driven.

6. A material spreader, comprising: a mobile supporting frame; a material-carrying body having a bottom portion and opposite wall portions adjoining and extending upwardly from the bottom portion; means carrying the body on the frame for rotation through 360° about a generally horizontal axis; and means for tilting the body in increments about said axis including continuously driven input means carried by the frame and step-by-step mechanism connecting said input means and the body.

7. A material spreader, comprising: an elongated, generally horizontal supporting frame having front and rear end portions; wheel means carrying the frame for travel lengthwise over a field; a pair of supports respectively at the front and rear end portions of the frame, each support including a bearing on a longitudinal horizontal axis, and said bearings being coaxial; an elongated material-carrying body disposed lengthwise of the frame and between the supports and having longitudinally spaced front and rear end wall elements, a bottom portion and a pair of longitudinal side wall portions, each of said side wall portions having an upper edge, and said body being normally positioned with the bottom lowermost; front and rear trunnion means respectively connected to the front and rear end wall elements and mounted respectively in the front and rear supports to carry the body for tilting about the bearing axis; means for tilting the body about the bearing axis to effect the flow of material in the body toward the upper edge of one of the side wall portions; and material-engaging means movably carried by the body for cooperation with said one upper edge to engage and move material over said one upper edge as the body is tilted.

8. A material spreader as defined in claim 7, further characterized in that: the means for tilting the body includes driving mechanism for slowly tilting the body so that the flow of material toward said upper edge is gradual.

9. A material spreader, comprising: a supporting frame; means carrying the frame for advance over a field; a material-carrying body having a bottom and opposite side portions, one of said portions having an upper edge, and said body being disposed relative to the supporting frame so that said upper edge generally parallels the line of advance of the spreader; means carrying the body on the frame and providing for lowering of said upper edge relative to the bottom portion of the body from an initial high position to an ultimate low position so that material in the body will move toward and for discharge over said upper edge, and power means connected between the frame and body for causing lowering of said upper edge as aforesaid, said power means including a constantly running driving member on the frame and an intermittently running driven member on the body and connected to said driving member for gradual lowering of said upper edge so as to move the material toward said upper edge in successive quantities less than the entire volume of the body.

10. A material spreader, comprising: a mobile supporting frame; an elongated body having a bottom portion and generally upwardly extending wall portions, one of said wall portions terminating in an upper edge running lengthwise of the body; means carrying the body on the frame and including provision for tilting the body about an axis lengthwise thereof so that said upper edge is lowered and material carried by the body will flow toward said upper edge; drivable material-engaging means carried by the body and extending substantially throughout the length of said upper edge and operative in an outward direction transverse to said upper edge to distribute material over said upper edge and onto the ground as the body is tilted; second drivable means for tilting the body; and driving mechanism for simultaneously driving the body-tilting means and the material-engaging means.

11. A material spreader as defined in claim 10, further characterized in that: the driving mechanism includes first power-transmitting means for driving the material-engaging means at a relatively high speed, and second power-transmitting means for driving the body-tilting means at a relatively lower speed.

12. A material spreader as defined in claim 11, further characterized in that: the second power-transmitting means includes variable-speed mechanism for selectively varying the speed of the body-tilting means.

13. A material spreader as defined in claim 10, further characterized in that: the driving mechanism includes constant speed input means, first power-transmitting means connecting the input means to the material-engaging means for driving the latter at a certain speed, and second power-transmitting means connecting the input means to the body-tilting means and including speed-reduction means for driving the body-tilting means at a relatively lower speed.

14. A material spreader, comprising: a supporting frame; means carrying the frame for advance over a field; a material-carrying body having a bottom and opposite side portions, one of said portions having an upper edge, and said body being disposed relative to the supporting frame so that said upper edge generally parallels the line of advance of the spreader; means carrying the body on the frame for tilting about an axis paralleling said upper edge and in a direction causing lowering of said upper edge; beater means carried by the body and arranged along said upper edge in a position normally clear of material in the body; means for tilting the body as aforesaid to compel material to run toward said upper edge to be engaged by the beater means; and said beater means including material-engaging elements operative to move laterally outwardly relative to the body to engage and move the tilt-compelled material over said upper edge and onto the ground alongside the body.

15. A material spreader, comprising: a supporting frame; means carrying the frame for advance over a field; a material-carrying body having a bottom and opposite side portions, one of said portions having an upper edge, and said body being disposed relative to the supporting frame so that said upper edge generally parallels the line of advance of the spreader; means carrying the body on the frame in a normal level position and providing for lowering of said upper edge relative to the bottom portion of the body from an initial high position to an ultimate low position so that material in the body will move toward and for discharge over said upper edge; power means connected between the frame and body for causing lowering of said upper edge as aforesaid, said power means including relatively movable members interconnected by retarding means providing for gradual lowering of said upper edge so as to compel the material toward said upper edge in successive quantities less than the entire volume of the body; and means movably carried by the body and arranged along said upper edge in a position clear of the material when the body is level and operative when the body is tilted to engage such tilt-compelled quantities of material for distributing the material over said upper edge.

References Cited in the file of this patent

UNITED STATES PATENTS

| Number | Name | Date |
|---|---|---|
| 648,152 | Loessner | Apr. 24, 1900 |
| 1,101,878 | Newbert | June 30, 1914 |
| 1,215,614 | Brown | Feb. 13, 1917 |
| 1,259,739 | Hinkle | Mar. 19, 1918 |
| 1,495,382 | Clark | May 27, 1924 |
| 1,724,379 | Storm | Aug. 13, 1929 |
| 1,734,320 | Williams | Nov. 5, 1929 |
| 1,963,478 | Swanson et al. | June 19, 1934 |
| 2,094,572 | Hendricks et al. | Sept. 28, 1937 |
| 2,430,020 | Johnson | Nov. 4, 1947 |
| 2,467,718 | Acton | Apr. 19, 1949 |
| 2,496,876 | Kayser | Feb. 7, 1950 |
| 2,553,455 | Higby | May 15, 1951 |